United States Patent
Sadri et al.

(10) Patent No.: US 7,345,989 B2
(45) Date of Patent: Mar. 18, 2008

(54) ADAPTIVE CHANNELIZATION SCHEME FOR HIGH THROUGHPUT MULTICARRIER SYSTEMS

(75) Inventors: Ali S. Sadri, San Diego, CA (US); Alexander A. Maltsev, Nizhny Novgorod (RU); Vadim S. Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 681 days.

(21) Appl. No.: 10/812,284

(22) Filed: Mar. 29, 2004

(65) Prior Publication Data

US 2005/0152328 A1   Jul. 14, 2005

Related U.S. Application Data

(60) Provisional application No. 60/536,071, filed on Jan. 12, 2004.

(51) Int. Cl.
*H04Q 7/20* (2006.01)

(52) U.S. Cl. .................. 370/203; 370/344; 370/465
(58) Field of Classification Search .......... 370/203, 370/208, 464, 465, 468, 498, 536, 210, 328, 370/338, 310, 342, 431, 441, 480, 493, 494, 370/436, 458, 543, 544, 344, 319; 375/130, 375/140, 141, 144; 455/296, 130, 500, 507, 455/517, 39, 103, 104
See application file for complete search history.

(56) References Cited

U.S. PATENT DOCUMENTS

| | | | |
|---|---|---|---|
| 4,679,227 A | 7/1987 | Hughes-Hartogs | 379/98 |
| 4,731,816 A | 3/1988 | Hughes-Hartogs | 379/98 |
| 4,833,706 A | 5/1989 | Hughes-Hartog | 379/98 |
| 6,198,460 B1 | 3/2001 | Brankovic | |
| 6,282,167 B1 | 8/2001 | Michon et al. | |
| 6,683,855 B1 | 1/2004 | Bordogna et al. | |
| 6,785,341 B2* | 8/2004 | Walton et al. | 375/267 |
| 6,831,902 B1 | 12/2004 | Dougherty et al. | |
| 6,862,552 B2 | 3/2005 | Goldstein et al. | |
| 2002/0183010 A1* | 12/2002 | Catreux et al. | 455/67.1 |
| 2003/0032390 A1* | 2/2003 | Geile et al. | 455/3.05 |

(Continued)

FOREIGN PATENT DOCUMENTS

EP   1267513 A2   12/2002

(Continued)

OTHER PUBLICATIONS

Chow, Peter, et al., "A Practical Discrete Multitone Transceiver Loading Algorithm for Data Transmission over Spectrally Shaped Channels", *IEEE Transactions on Communications*, vol. 43, No. 2/3/4, (1995),773-775.

(Continued)

*Primary Examiner*—Jean Gelin
(74) *Attorney, Agent, or Firm*—The Law offices of John C. Scott; John C. Scott

(57) ABSTRACT

Adaptive channelization is achieved in a high throughput multicarrier system by first subdividing a high throughput channel into a number of frequency sub-channels. A channelization decision may then be made within a device as to which of the sub-channels to use for a corresponding high throughput wireless link based on channel state information.

39 Claims, 4 Drawing Sheets

U.S. PATENT DOCUMENTS

| | | | |
|---|---|---|---|
| 2004/0001535 A1* | 1/2004 | Kannan et al. | 375/222 |
| 2004/0062193 A1* | 4/2004 | Ma et al. | 370/208 |
| 2004/0132496 A1* | 7/2004 | Kim et al. | 455/562.1 |
| 2004/0151145 A1* | 8/2004 | Hammerschmidt | 370/338 |
| 2004/0190637 A1* | 9/2004 | Maltsev et al. | 375/260 |
| 2005/0128935 A1* | 6/2005 | Tang et al. | 370/208 |
| 2005/0166131 A1 | 7/2005 | Xia et al. | |

FOREIGN PATENT DOCUMENTS

| | | |
|---|---|---|
| WO | WO-0076115 A1 | 12/2000 |
| WO | WO-0249306 A2 | 6/2002 |
| WO | WO-2005069527 A1 | 7/2005 |
| WO | WO-2005071876 A1 | 8/2005 |

OTHER PUBLICATIONS

Fischer, Robert, et al., "A New Loading Algorithm for Discrete Multitone Transmission", *IEEE*, (1996),724-728.

Leke, Achankeng, et al., "A Maximim Rate Loading Algorithm for Discrete Multitone Modulation Systems", *IEEE*, (1997),1514-1517.

Leke, Achankeng, et al., "Transmit Optimization for Time-Invariant Wireless Channels Utilizing a Discrete Multitone Approach", *IEEE*, (1997),954-958.

Futaki, H., et al., "Performance of Low-Density Parity-Check (LDPC) Coded OFDM Systems", *IEEE International Conference on Communications*, 1 of 5, ICC 2002,(Apr. 28, 2002),1696-1700.

Sollenberger, N. R., et al., "Receiver Structures for Multiple Access OFDM", *Vehicular Technology Conf., IEEE 49th Houston*, 1, (May 16, 1999),468-472.

Syed, M. J., et al., "LDPC-based Space-time Coded OFDM Systems Performances over Correlated Fading Channels", *Communications, APCC 2003, The 9th Asia-Pacific Conference*, 2, (Sep. 21, 2003),590-594.

Yang, M., et al., "Design of Efficiently Encodable Moderate Length High-Rate Irregular LDPC Codes", *Proceedings of the Annual Conference on Communication, Control and Computing*, (Oct. 2, 2002),1415-1424.

"International Search Report PCT/US2005/000948", 19 pages, no date.

* cited by examiner

```
                    80
                      ↘

┌─────────────────────────────┐ ─82
        │  ACQUIRE CHANNEL STATE      │
        │  INFORMATION ASSOCIATED WITH A │
        │  HIGH THROUGHPUT CHANNEL HAVING │
        │  A PLURALITY OF SUPPORTED SUB- │
        │  CHANNELS                   │
        └─────────────────────────────┘
                     │
                     ▼
        ┌─────────────────────────────┐ ─84
        │  DETERMINE WHICH SUB-CHANNELS TO │
        │  USE FOR A PREDETERMINED USER │
        │  BASED ON THE CHANNEL STATE │
        │  INFORMATION                │
        └─────────────────────────────┘
                     │
                     ▼
        ┌─────────────────────────────┐ ─86
        │  DELIVER SUB-CHANNEL ADAPTATION │
        │  INFORMATION TO RECEIVER CHAIN │
        │  AND/OR TRANSMITTER CHAIN FOR USE │
        │  IN PROCESSING MULTICARRIER SIGNAL │
        └─────────────────────────────┘
```

Fig. 5

ADAPTIVE CHANNELIZATION SCHEME FOR HIGH THROUGHPUT MULTICARRIER SYSTEMS

The present application claims the benefit of U.S. Provisional Application Ser. No. 60/536071, filed Jan. 12, 2004, entitled "A SYSTEM APPARATUS AND ASSOCIATED METHODS FOR HIGH THROUGHPUT WIRELESS NETWORKING."

FIELD OF THE INVENTION

The invention relates generally to wireless communications and, more particularly, to channelization schemes for use in wireless systems.

BACKGROUND OF THE INVENTION

In some multicarrier communication technologies, such as orthogonal frequency division multiplexing (OFDM) systems and discrete multitone (DMT) systems, efforts are being made to achieve a higher overall communication throughput. In some instances, higher throughput is being achieved by increasing the bandwidth of multicarrier signals and/or increasing the number of subcarriers used within a multicarrier signal. In some OFDM-based wireless networking technologies, for example, techniques are being developed that allow several OFDM channels (e.g., several IEEE 802.11a channels) to be teamed together to achieve a higher throughput channel for a device. When such channel teaming is implemented, there is a possibility that other devices communicating on one or more of the teamed channels (e.g., within a neighboring basic service set (BSS) in a wireless network) may create interference within the teamed channel that can compromise the quality of the corresponding communication.

BRIEF DESCRIPTION OF THE DRAWINGS

FIG. 5 is a flowchart illustrating a method for use in implementing adaptive channelization within a multicarrier device in accordance with an embodiment of the present invention.

DETAILED DESCRIPTION

Figure 1:
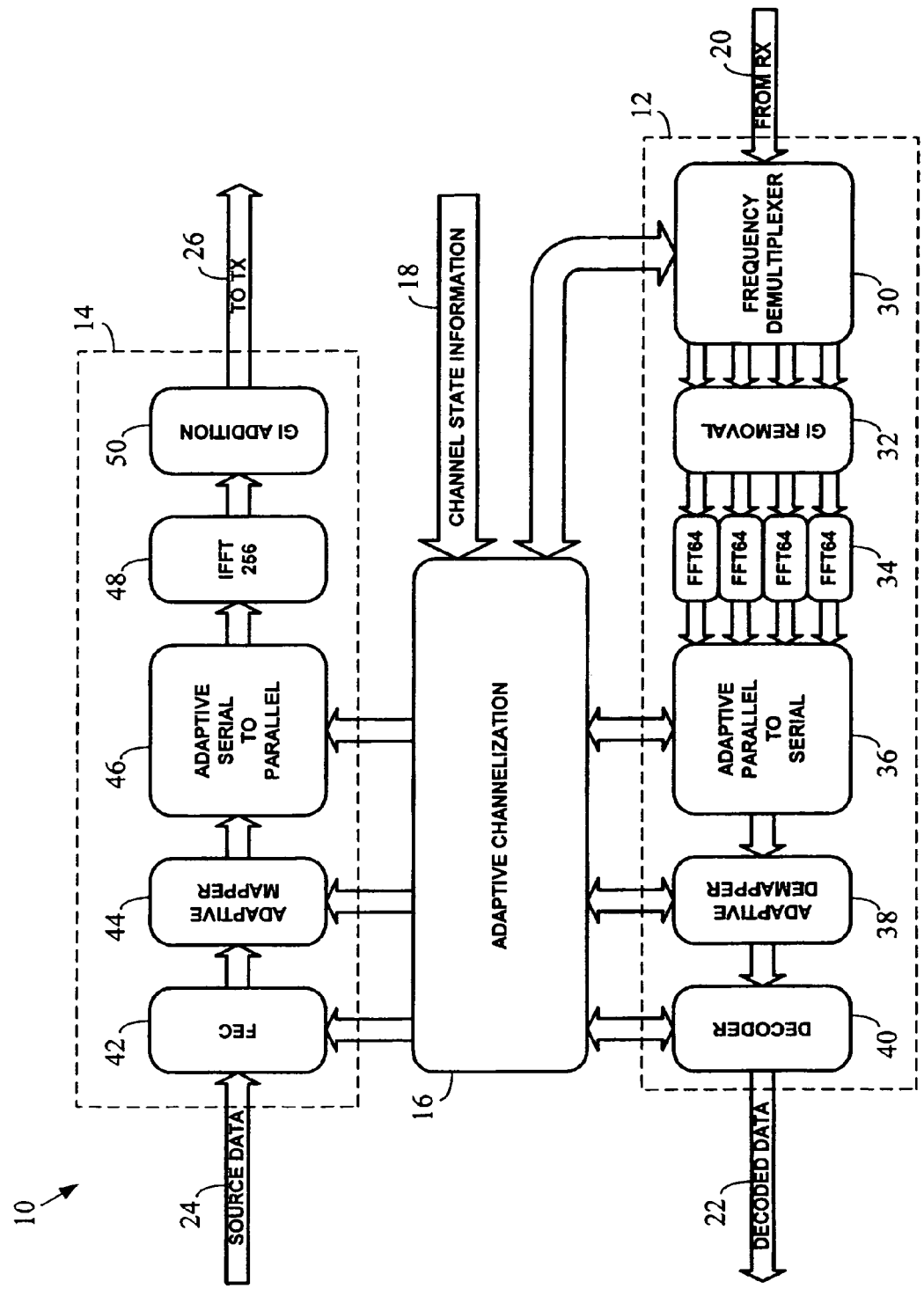
FIG. 1 is a block diagram illustrating an example wireless apparatus in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to adaptive channelization techniques and structures for use in multicarrier communications. A high throughput (HT) multicarrier communication channel is divided into multiple frequency sub-channels. The division of the communication channel allows the individual sub-channels to be processed separately. A communication device that is operative within the system may determine which of the available sub-channels to use for a particular wireless link based on, for example, channel state information that may be indicative of current channel usage. The communication device may then communicate with a remote entity using the identified sub-channels. In at least one embodiment, the frequency sub-channels that are used to make up the high throughput multicarrier channel are predefined channels. For example, in one implementation for use in a wireless networking environment, a high throughput multicarrier channel is formed using multiple 20 megaHertz (MHz) IEEE 802.11a (IEEE Std 802.11a-1999) orthogonal frequency division multiplexing (OFDM) channels. Many other arrangements for defining the frequency sub-channels may alternatively be used. By dividing a high throughput multicarrier channel into a number of frequency sub-channels that may be processed separately, problems caused by interference within one or more of the sub-channels may be dealt with by, for example, simply ignoring or not using the affected sub-channels as part of a corresponding wireless link.

FIG. 1 is a block diagram illustrating an example wireless apparatus 10 in accordance with an embodiment of the present invention. The wireless apparatus 10 is capable of supporting wireless communication via a multi-carrier communication channel that is made up of a number of frequency sub-channels. For example, in one possible application, the wireless apparatus 10 may be implemented within a wireless network and be capable of supporting communication within a high throughput channel that includes multiple separate IEEE 802.11a wireless channels having different center frequencies. Other channel arrangements are also possible. Although the inventive techniques have application in all forms of multicarrier systems, the wireless apparatus 10 of FIG. 1 will be discussed in the context of an OFDM-based multi-carrier system.

As shown in FIG. 1, the wireless apparatus 10 may include one or more of: a receiver chain 12, a transmitter chain 14, and an adaptive channelization controller 16. Although illustrated with both a receiver chain 12 and a transmitter chain 14, it should be appreciated that embodiments having only a receiver chain 12 or a transmitter chain 14 may be provided. The adaptive channelization controller 16 is operative for determining which of the individual multicarrier sub-channels supported by the wireless apparatus 10 are to be teamed for use in association with a user at a particular point in time. The adaptive channelization controller 16 may make the determination based on, for example, channel state information 18. The receiver chain 12 receives a multicarrier receive signal 20 from a radio frequency (RF) receiver and processes the signal in accordance with control information from the adaptive channelization controller 16 to generate decoded data 22 at an output thereof. The transmitter chain 14 receives source data 24 at an input thereof and processes the source data 24 in accordance with control information from the adaptive channelization controller 16 to generate a multicarrier transmit signal 26 for delivery to an RF transmitter. In at least one approach, the adaptive channelization controller 16 will continuously update the channelization decision for the apparatus 10 based on the current channel state.

In at least one embodiment of the present invention, as illustrated in FIG. 1, the receiver chain 12 may include: a frequency demultiplexer 30, a guard interval (GI) removal unit 32, a number of fast Fourier transform (FFT) units 34, an adaptive parallel to serial converter 36, an adaptive demapper 38, and a decoder 40. The frequency demultiplexer 30 receives the multicarrier receive signal 20 and separates the signal into multiple portions that correspond to the frequency sub-channels discussed previously. In the embodiment of FIG. 1, for example, the multicarrier receive signal 20 is separated into four output streams by the frequency demultiplexer 30. It should be appreciated that any number of output streams may be generated in this manner in accordance with the invention. As discussed previously, in at least one embodiment, the apparatus 10 is capable of transmitting within a high throughput multicarrier channel consisting of multiple individual IEEE 802.11a channels (e.g., the four channels having center frequencies of 5180, 5200, 5220, and 5240 MHz, respectively). The frequency demultiplexer 30 maybe configured to separate the received multicarrier signal based on these sub-channels. Other arrangements are also possible. Each of the sub-channels will typically include multiple subcarriers that can each be modulated with a corresponding data symbol. In at least one embodiment, analog filtration techniques are used to perform the frequency demultiplexing, although other techniques may alternatively be used (e.g., digital filtration techniques, a combination of analog and digital filtration techniques, etc.). Any number of individual frequency sub-channels may be defined for a given HT multicarrier channel.

The multiple streams output by the frequency demultiplexer 30 may be processed separately from one another. In this manner, potential interference within one of the sub-channels can be isolated from the other sub-channels and thus have little or no effect on the processing of the other sub-channels. That is, it may be decided that the sub-channel having the interference will not be made part of the corresponding communication link, and may thus be ignored. For example, if the adaptive channelization controller 16 determines that the third of four sub-channels is currently being used by another communication link within the vicinity of the apparatus 10, it may decide to use only the other three sub-channels as part of the communication link for a local user. The adaptive channelization controller 16 may then deliver control information to the receiver chain 12 that indicates which sub-channels are presently being used and the receiver chain 12 may thereafter ignore information within the inactive sub-channel during a subsequent receive operation.

The GI removal unit 32 is operative for removing a guard interval from each of the separated signals output by the frequency demultiplexer 30. Guard intervals are placed in transmitted signals to, among other things, increase the immunity of the signals to, for example, multipath effects in the channel. The individual FFT units 34 (four 64-sample FFTs in the illustrated embodiment) are operative for separately converting each of the separated signals (i.e., each of the sub-channels) from a time domain representation to a frequency domain representation. Although illustrated with a separate FFT for each sub-channel, it should be appreciated that a single FFT (e.g., one 64-sample FFT) may be used with time division access to process each sub-channel separately. The frequency domain representation of each separated signal will include the modulation data points associated with each of the corresponding subcarriers within the signal. Although illustrated as fast Fourier transform (FFT) units, it should be appreciated that any form of discrete Fourier transform may be used.

The adaptive parallel to serial converter 36 receives the data points output by the FFT units 34 and converts the information to a serial stream. The adaptive parallel to serial converter 36 receives control information from the adaptive channelization controller 16 that is indicative of the current channelization scenario for the apparatus 10. For example, the adaptive channelization controller 16 may inform the adaptive parallel to serial converter 36 that only some of the supported sub-channels (e.g., a first and third of four sub-channels) are currently teamed for a corresponding user. In one possible approach, the adaptive parallel to serial converter 36 will then generate the serial stream by merging information received in the currently active sub-channels. The received information from the sub-channels that are not presently being used may be ignored. In another approach, the adaptive parallel to serial converter 36 may add zeros (or some other predetermined symbol) to the output data stream in positions corresponding to the unused sub-channels. The adaptive demapper 38 receives the serial stream output by the adaptive parallel to serial converter 36 and demaps the corresponding data based on a predetermined signal constellation. Any of a variety of different modulation schemes may be used including, for example, BPSK, QPSK, 8-PSK, 16QAM, 64QAM, 128QAM, 256QAM, and/or others. In at least one embodiment, the modulation technique may be adaptable based on, for example, current channel conditions, etc. The adaptive demapper 38 may also receive channelization information from the adaptive channelization controller 16 to allow the demapper 38 to adapt to the present channel scenario. The decoder 40 may then decode the demapped data stream to, for example, detect and/or correct errors within the corresponding data.

Referring again to FIG. 1, in at least one embodiment, the transmitter chain 14 may include: a forward error code (FEC) coder 42, an adaptive mapper 44, an adaptive serial-to-parallel converter 46, an inverse FFT (IFFT) unit 48, and a guard interval addition unit 50. The FEC coder 42 receives the source data 24 at an input thereof and codes the data based on a predetermined forward error-correcting code. Any of a variety of different codes may be used. The adaptive mapper 44 then maps the coded data based on a predetermined signal constellation to generate signal points at an output thereof. The adaptive serial-to-parallel converter then converts the stream of signal points output by the adaptive mapper 44 into a parallel format for delivery to the IFFT 48. The FEC coder 42, the adaptive mapper 44, and the adaptive serial-to-parallel converter 46 may each receive channelization-related control information from the adaptive channelization controller 16 that is indicative of the present channelization scheme for a corresponding user. In this manner, zeros (or some other predetermined symbols) may be added to the data in positions corresponding to the sub-channels that are not currently being used in the teamed channel (e.g., using a technique known as puncturing). The IFFT unit 48 (a 256-sample IFFT in the illustrated embodiment) takes the parallel data points output by the adaptive serial-to-parallel converter 46 and converts them from a frequency domain representation to a time domain representation. Because there is no potential interference to be dealt with during the transmit operation, the individual sub-channels are not processed separately by the IFFT 48 as in the receiver chain 12 discussed previously (although in at least one embodiment, the individual sub-channels are processed separately in the transmitter to, for example, simplify the digital processing). The GI addition unit 50 adds a guard interval to the time domain signal output by the IFFT unit 48. The resulting signal is then delivered to the corresponding RF transmitter to be transmitted into the wireless channel.

The channel state information 18 used by the adaptive channelization controller 16 may include any type of information from which the current channel usage scenario may be determined. This may be either a closed loop process, an open loop process, or a combination of the two. In one approach, for example, the adaptive channelization controller 16 may receive the channel state information 18 from the remote side of the communication link. In another approach, the channel state information may be generated locally (e.g., noise-to-signal ratio (NSR) per subcarrier values estimated during a previous packet exchange, etc.). The adaptive channelization controller 16 may use the channel state information to identify, for example, sub-channels that are presently occupied. The adaptive channelization controller 16 may then select the remaining unoccupied sub-channels (or a subset thereof) for use in the corresponding wireless link. Other factors may also be taken into consideration in making the channelization decision.

In at least one embodiment of the present invention, the inventive principles are implemented within a wireless networking environment. For example, the wireless apparatus 10 of FIG. 1 may be located within, for example, a wireless user device (e.g., a laptop, desktop, palmtop, or tablet computer having wireless networking capability, a personal digital assistant (PDA) having wireless networking capability, a cellular telephone or other handheld communicator, etc.) and/or within a wireless access point. In a wireless user device, the adaptive channelization controller 16 will often determine (and adapt) a channelization scheme for a single corresponding user. In an access point, on the other hand, channelization schemes may need to be tracked for multiple users simultaneously. Many other scenarios are also possible. The wireless apparatus 10 may also be part of a wireless network interface card or other wireless network interface structure. In at least one embodiment, the wireless apparatus 10 is implemented on a single radio frequency integrated circuit (RFIC). Many other implementations are also possible.

It should be appreciated that the individual blocks illustrated in FIG. 1 may be functional in nature and do not necessarily correspond to discrete hardware elements. For example, in at least one embodiment, two or more of the blocks are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and/or hybrid implementations may be made.

Figure 2:
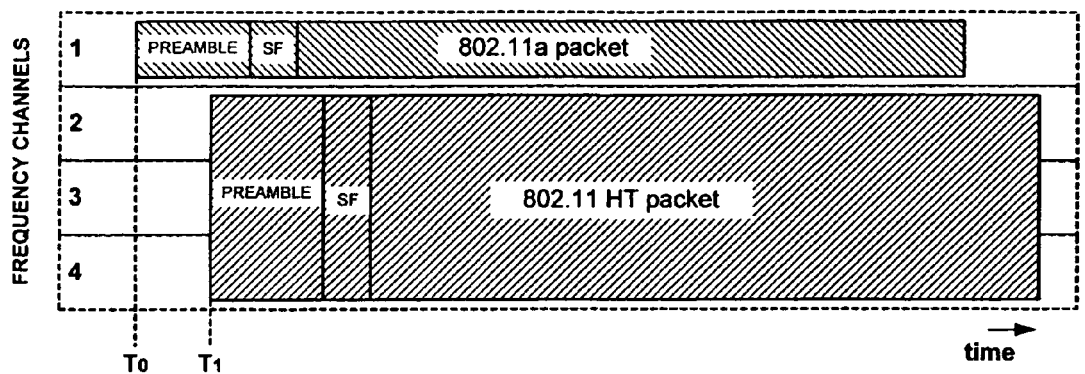
FIGS. 2, 3, and 4 are channel usage diagrams illustrating possible operational scenarios for a high throughput communication device in accordance with embodiments of the present invention.
Figure 3:
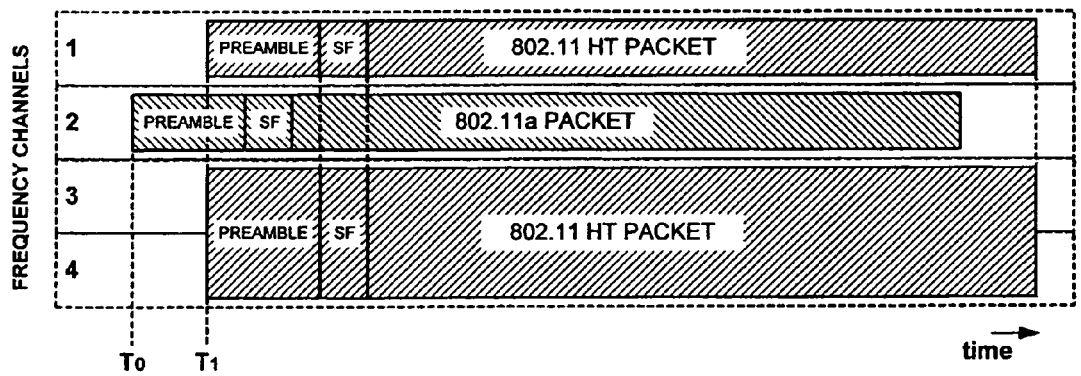
Figure 4:
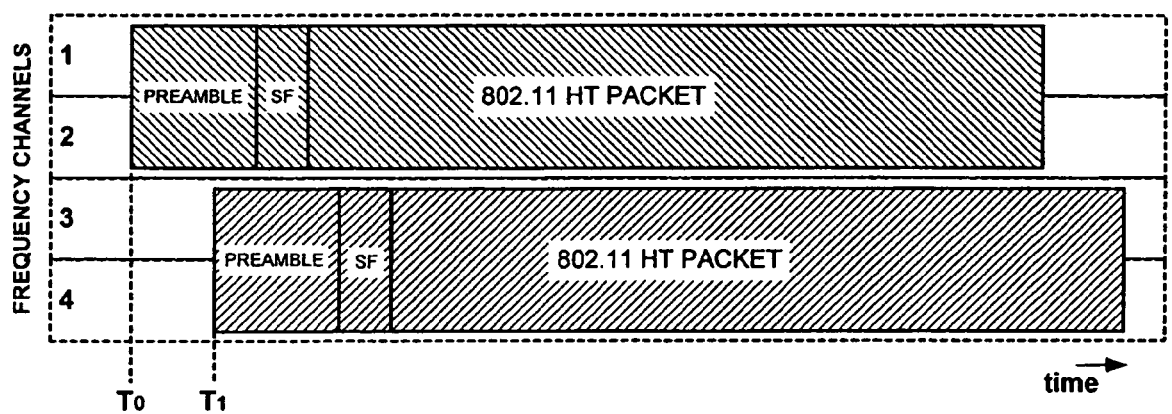

FIGS. 2, 3, and 4 are channel usage diagrams illustrating possible operational scenarios for a high throughput communication device that is capable of operating within four frequency sub-channels in accordance with embodiments of the present invention. With reference to FIG. 2, a high throughput device may monitor its supported channels and notice that an IEEE 802.11a device is currently operational within a first of the four sub-channels (e.g., frequency sub-channel 1 in FIG. 2). The IEEE 802.11a device may be operative within an entirely different basic service set (BSS) as the high throughput device or within the same BSS. The HT device then makes a decision to operate within the remaining three contiguous sub-channels (e.g., frequency sub-channels 2, 3, and 4 in FIG. 2). FIG. 3 illustrates a similar scenario, except that the three sub-channels that the HT device decides to operate within are non-contiguous (e.g., frequency sub-channels 1, 3, and 4). FIG. 4 illustrates a scenario in which an HT device determines that multiple sub-channels (i.e., frequency sub-channels 1 and 2 in FIG. 4) are currently occupied by another HT device communicating in the vicinity. The first HT device thereafter decides to operate within the two remaining sub-channels (i.e., frequency sub-channels 3 and 4 in FIG. 4). As will be appreciated, many other operational scenarios may also exist in accordance with the present invention. In a wireless networking environment, the inventive principles maybe used, for example, to provide for the coexistence of legacy systems (e.g., IEEE 802.11a systems, etc.) and more modem high throughout systems. The inventive principles may also be used to organize multiple transmitting sessions between several stations by sharing the same frequency band. Another possible use of the inventive techniques in a wireless network is to allow multiple legacy networks using different frequency channels to be merged into a single BSS using a single wireless access point.

FIG. 5 is a flowchart illustrating a method 80 for use in implementing adaptive channelization within a multicarrier device that is capable of operating within a high-throughput (HT) channel having multiple sub-channels. First, channel state information is acquired for the HT multicarrier channel (block 82). The channel state information may be developed locally, such as by measurements made by a local receiver, and/or it may be received from a remote entity, such as a communication device at the other side of the corresponding communication link. A decision is then made as to which of the supported sub-channels will be used for a corresponding wireless link based on the channel state information (block 84). In one approach, the channel state information is used to identify which of the supported sub-channels are currently occupied. Sub-channels are then selected from the unoccupied sub-channels. Other selection techniques may alternatively be used. Sub-channel adaptation information is then delivered to a receiver chain and/or a transmitter chain for use in processing a corresponding multicarrier receive and/or transmit signal (block 86).

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A wireless apparatus comprising:
   an adaptive channelization controller to determine which of a plurality of predetermined sub-channels to use to support a multicarrier wireless link, based on channel state information; and
   a receiver chain to process a received multicarrier signal associated with said multicarrier wireless link based on control information output by said adaptive channelization controller;
   wherein said receiver chain includes:
      a frequency demultiplexer to separate said received multicarrier signal into multiple signal portions based on frequency, said multiple signal portions corresponding to said plurality of predetermined sub-channels; and
      a plurality of Fourier transform units to separately process said multiple signal portions output by said frequency demultiplexer, said plurality of Fourier transform units including at least a first Fourier transform unit to process a first signal portion and a second Fourier transform unit to process a second signal portion; and
      an adaptive parallel to serial converter to receive output streams from said plurality of Fourier transform units and to merge said output streams into a serial stream based on control information from said adaptive channelization controller.

2. The wireless apparatus of claim 1, further comprising:
   a transmitter chain to generate a multicarrier transmit signal for said multicarrier wireless link based on control information output by said adaptive channelization controller.

3. The wireless apparatus of claim 2, wherein:
   said transmitter chain comprises a forward error correction (FEC) encoder to encode source data and an adaptive mapper to map the encoded data based on a predetermined modulation constellation.

4. The wireless apparatus of claim 3, wherein:
   said transmitter chain further comprises an adaptive serial to parallel converter to convert a serial stream output by said adaptive mapper to a parallel format based on control information from said adaptive channelization controller.

5. The wireless apparatus of claim 4, wherein:
   said adaptive serial to parallel converter adds zeros to a parallel output stream in data positions corresponding to sub-channels that are not currently being used to support said multicarrier wireless link.

6. The wireless apparatus of claim 4, wherein:
   said multicarrier transmit signal is an orthogonal frequency division multiplexing (OFDM) signal; and
   said transmitter chain further includes an inverse Fourier transform unit to convert a parallel output signal of said adaptive serial to parallel converter from a frequency domain representation to a time domain representation.

7. The wireless apparatus of claim 6, wherein:
   said transmitter chain further includes a guard interval addition unit to add a guard interval to said time domain representation output by said inverse Fourier transform unit.

8. The wireless apparatus of claim 2, wherein:
   said adaptive channelization controller, said receiver chain, and said transmitter chain are all implemented on the same semiconductor chip.

9. The wireless apparatus of claim 1, wherein:
   said receiver chain further includes a guard interval removal unit between said frequency demultiplexer and said plurality of Fourier transform units to remove guard intervals from said multiple signal portions output by said frequency demultiplexer.

10. The wireless apparatus of claim 1, wherein:
    said plurality of Fourier transform units includes at least one fast Fourier transform unit.

11. The wireless apparatus of claim 1, wherein:
    said adaptive parallel to serial converter ignores output streams that are associated with sub-channels that are not currently used in support of said multicarrier wireless link.

12. The wireless apparatus of claim 1, wherein:
    said receiver chain further includes an adaptive demapper to demap data within said serial stream output by said adaptive parallel to serial converter based on control information from said adaptive channelization controller.

13. The wireless apparatus of claim 1, wherein:
    said channel state information includes information received from a remote location.

14. The wireless apparatus of claim 1, wherein:
    said channel state information includes information that was measured within said wireless apparatus.

15. A wireless apparatus comprising:
    a frequency demultiplexer to separate a received multicarrier signal into multiple portions based on frequency, said multiple portions corresponding to a plurality of predetermined frequency sub-channels and including at least a first portion and a second portion;
    a first Fourier transform unit to convert said first portion of said multicarrier signal from a time domain representation to a frequency domain representation;
    a second Fourier transform unit to convert said second portion of said multicarrier signal from a time domain representation to a frequency domain representation, separately from said first portion of said multicarrier signal; and
    an adaptive parallel to serial converter to receive output streams from at least said first and second Fourier transform units and to merge said output streams into a serial stream based on control information received from an adaptive channelization controller, said adaptive channelization controller to determine which of said plurality of predetermined frequency sub-channels to use to support a multicarrier wireless link based on channel state information.

16. The wireless apparatus of claim 15, wherein:
    said second Fourier transform unit is a different unit from said first Fourier transform unit.

17. The wireless apparatus of claim 15, wherein:
    said first and second Fourier transform units are the same unit, wherein said unit processes said first and second portions of said multicarrier signal at different times.

18. The wireless apparatus of claim 15, further comprising:
    a guard interval removal unit between said frequency demultiplexer and said first Fourier transform unit to remove a guard interval from said first signal portion before said first signal portion reaches said first Fourier transform unit.

19. The wireless apparatus of claim 15, wherein:
    said received multicarrier signal is an orthogonal frequency division multiplexing (OFDM) multicarrier signal.

20. The wireless apparatus of claim 15, further comprising:
  at least one other Fourier transform unit to convert at least one other portion of said multicarrier signal from a time domain representation to a frequency domain representation.
21. The wireless apparatus of claim 15, wherein:
  said frequency demultiplexer includes an analog filter.
22. The wireless apparatus of claim 15, wherein:
  said adaptive parallel to serial converter ignores output streams that are associated with sub-channels that are not currently used in support of said multicarrier wireless link.
23. The wireless apparatus of claim 15, further comprising:
  an adaptive demapper to demap data within said serial stream output by said adaptive parallel to serial converter based on control information from said adaptive channelization controller.
24. A method comprising:
  acquiring channel state information associated with a channel having a plurality of sub-channels;
  determining which sub-channels within said plurality of sub-channels to use for a wireless link based on said channel state information and generating sub-channel adaptation information based thereon;
  delivering sub-channel adaptation information to a receiver chain for use in processing a multicarrier receive signal associated with said wireless link;
  dividing said multicarrier receive signal into a plurality of frequency sub-channel components;
  individually transforming each of said plurality of frequency sub-channel components from a time domain representation to a frequency domain representation, wherein individually transforming generates a plurality of output streams that includes at least a first stream for a first frequency sub-channel component in said plurality of frequency sub-channel components and a second stream for a second frequency sub-channel component in said plurality of frequency sub-channel components; and
  adaptively parallel to serial converting said plurality of output streams to merge said output streams into a serial stream based on said sub-channel adaptation information.
25. The method of claim 24, wherein:
  said channel state information includes information received from a remote location.
26. The method of claim 24, wherein:
  said channel state information includes information that was measured within a local receiver.
27. The of 24, wherein:
  determining which sub-channels within said plurality of sub-channels to use for said wireless link includes identifying sub-channels that are not currently being used by other links.
28. The method of 24, further comprising:
  delivering sub-channel adaptation information to a transmitter chain for use in generating a multicarrier transmit signal for said wireless link.
29. The method of 24, wherein:
  adaptively parallel to serial converting includes ignoring output streams that are associated with sub-channels that are not currently used for said wireless link.
30. The method of 24, further comprising:
  adaptively demapping data in said serial stream based on said sub-channel adaptation information.

31. A method comprising:
  dividing a received multicarrier signal into a plurality of frequency sub-channel components;
  individually transforming each of said plurality of frequency sub-channel components from a time domain representation to a frequency domain representation; and
  converting said frequency domain representations resulting from individually transforming said plurality of frequency sub-channel components to a single serial stream based on control information received from an adaptive channelization controller, said control information identifying which sub-channels within a plurality of available sub-channels are being used for a wireless link.
32. The method of claim 31, wherein:
  individually transforming includes applying each of said plurality of frequency sub-channel components to a separate Fourier transform unit.
33. A system comprising:
  an adaptive channelization controller to determine which of a plurality of predetermined sub-channels to use to support a multicarrier wireless link, based on channel state information;
  at least one dipole antenna to receive a multicarrier signal associated with said wireless link; and
  a receiver chain to process said received multicarrier signal based on control information output by said adaptive channelization controller;
  wherein said receiver chain includes:
    a frequency demultiplexer to separate said received multicarrier signal into multiple signal portions based on frequency, said multiple signal portions corresponding to said plurality of predetermined sub-channels; and
    a plurality of Fourier transform units to separately process said multiple signal portions output by said frequency demultiplexer, said plurality of Fourier transform units including at least a first Fourier transform unit to process a first signal portion and a second Fourier transform unit to process a second signal portion; and
    an adaptive parallel to serial converter to receive output streams from said plurality of Fourier transform units and to merge said output streams into a serial stream based on control information from said adaptive channelization controller.
34. The system of claim 33, wherein:
  said adaptive channelization controller determines which of said plurality of predetermined sub-channels to use to support said multicarrier wireless link by identifying sub-channels that are currently being utilized by other wireless links.
35. The system of claim 33, wherein:
  said at least one dipole antenna includes multiple dipole antennas.
36. The system of claim 33, wherein:
  said receiver chain further includes an adaptive demapper to demap data within said serial stream output by said adaptive parallel to serial converter based on control information from said adaptive channelization controller.
37. An article comprising a computer readable storage medium having instructions stored thereon that, when executed by a computing platform, result in:
  acquiring channel state information associated with a channel having a plurality of sub-channels;

determining which sub-channels within said plurality of sub-channels to use for a wireless link based on said channel state information; and delivering sub-channel adaptation information to a receiver chain for use in processing a multicarrier receive signal associated with said wireless link, wherein said receiver chain includes a frequency demultiplexer to separate said multicarrier receive signal into multiple signal portions based on frequency, said multiple signal portions corresponding to said plurality of predetermined sub-channels, a plurality of Fourier transform units to separately process said multiple signal portions output by said frequency demultiplexer, said plurality of Fourier transform units including at least a first Fourier transform unit to process a first signal portion and a second Fourier transform unit to process a second signal portion, and an adaptive parallel to serial converter to receive output streams from said plurality of Fourier transform units and to merge said output streams into a serial stream based on said sub-channel adaptation information.

38. The article of claim 37, wherein:

determining which sub-channels within said plurality of sub-channels to use for said wireless link includes identifying sub-channels that are not currently being used by other wireless links.

39. The article of claim 37, wherein said storage medium further includes instructions that, when executed by said computing platform, result in:

delivering sub-channel adaptation information to a transmitter chain for use in generating a multicarrier transmit signal for said wireless link.

* * * * *

UNITED STATES PATENT AND TRADEMARK OFFICE
CERTIFICATE OF CORRECTION

PATENT NO. : 7,345,989 B2 Page 1 of 1
APPLICATION NO. : 10/812284
DATED : March 18, 2008
INVENTOR(S) : Sadri et al.

It is certified that error appears in the above-identified patent and that said Letters Patent is hereby corrected as shown below:

In column 9, line 52, in Claim 27, after "of" insert -- claim --.

In column 9, line 57, in Claim 28, after "of" insert -- claim --.

In column 9, line 61, in Claim 29, after "of" insert -- claim --.

In column 9, line 65, in Claim 30, after "of" insert -- claim --.

Signed and Sealed this

Eighth Day of July, 2008

JON W. DUDAS
*Director of the United States Patent and Trademark Office*